United States Patent
Lee et al.

(10) Patent No.: US 12,536,927 B2
(45) Date of Patent: Jan. 27, 2026

(54) ROTATING DISPLAY DEVICE USING SEMICONDUCTOR LIGHT-EMITTING ELEMENT

(71) Applicant: LG ELECTRONICS INC., Seoul (KR)

(72) Inventors: Soobeom Lee, Seoul (KR); Kwanwoo Park, Seoul (KR); Jeongin Cheon, Seoul (KR); Kyungho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 433 days.

(21) Appl. No.: 18/018,007

(22) PCT Filed: Aug. 3, 2020

(86) PCT No.: PCT/KR2020/010225
§ 371 (c)(1),
(2) Date: Jan. 25, 2023

(87) PCT Pub. No.: WO2022/030655
PCT Pub. Date: Feb. 10, 2022

(65) Prior Publication Data
US 2023/0274670 A1    Aug. 31, 2023

(51) Int. Cl.
*G09F 9/33* (2006.01)
*G09F 13/30* (2006.01)
*G09F 19/12* (2006.01)

(52) U.S. Cl.
CPC ............... *G09F 9/33* (2013.01); *G09F 13/30* (2013.01); *G09F 19/12* (2013.01)

(58) Field of Classification Search
CPC ......... G09F 9/33; G09F 13/30; H04N 13/388; H04N 13/393; G09G 3/005; G02B 30/54
See application file for complete search history.

(56) References Cited

U.S. PATENT DOCUMENTS

| | | | | |
|---|---|---|---|---|
| 4,160,973 A | * | 7/1979 | Berlin, Jr. ............ | H04N 13/393 345/82 |
| 4,573,048 A | * | 2/1986 | Dash ........................ | H04B 5/22 340/870.37 |
| 5,302,965 A | * | 4/1994 | Belcher .................... | G09F 9/33 340/815.43 |
| 2002/0005826 A1 | | 1/2002 | Pederson | |
| 2008/0094323 A1 | * | 4/2008 | Sirmon .................. | G09G 3/005 348/E9.026 |

FOREIGN PATENT DOCUMENTS

| | | |
|---|---|---|
| JP | 2004-105299 A | 4/2004 |
| KR | 10-2006-0079939 A | 7/2006 |
| KR | 10-2013-0044625 A | 5/2013 |
| KR | 10-2016-0122324 A | 10/2016 |

* cited by examiner

*Primary Examiner* — Priyank J Shah
(74) *Attorney, Agent, or Firm* — Birch, Stewart, Kolasch & Birch, LLP

(57) ABSTRACT

A rotating display device according to an embodiment comprises a fixed module and a rotation module rotatably connected to the fixed module, wherein the fixed module includes a motor for rotationally driving the rotation module, an input unit for receiving image data, and a light-emitting unit for emitting an optical signal corresponding to the image data, and the rotation module includes a light-receiving unit provided on the rotary shaft of the motor to receive the optical signal, and a light source module for outputting the image data received as the optical signal.

19 Claims, 13 Drawing Sheets

ROTATING DISPLAY DEVICE USING SEMICONDUCTOR LIGHT-EMITTING ELEMENT

CROSS REFERENCE TO RELATED APPLICATIONS

This application is the National Phase of PCT International Application No. PCT/KR2020/010225, filed on Aug. 3, 2020, all of which is hereby expressly incorporated by reference into the present application.

TECHNICAL FIELD

The present disclosure is applicable to display-device-related technical fields, and relates to a rotating display device using a light-emitting diode (LED), which is a semiconductor light-emitting element.

BACKGROUND ART

Recently, in the field of display technology, display devices having excellent characteristics, such as thinness and flexibility, have been developed. Meanwhile, currently commercialized major displays are represented by a liquid crystal display (LCD) and an organic light-emitting diode (OLED).

Meanwhile, a light-emitting diode (LED), which is a well-known semiconductor light-emitting element that converts current into light, has been used as a light source for displaying an image in electronic devices including information communication devices together with a GaP:N-based green LED, starting with commercialization of a red LED using a GaAsP compound semiconductor in 1962. Therefore, a method of solving the above-described problems by implementing a display using the semiconductor light-emitting element may be proposed. Such a light-emitting diode has various advantages, such as a long lifespan, low power consumption, excellent initial driving characteristics, and high vibration resistance, compared to a filament-based light-emitting element.

Meanwhile, when a light-emitting module in which light-emitting elements are arranged in one dimension is rotated and driven at a high speed according to the angle thereof, various letters, graphics, and videos may be recognized by a human due to an afterimage effect.

In general, when still images are continuously displayed at a rate of 24 or more sheets per second, a viewer recognizes the same as a video. A conventional image display device, such as a CRT, an LCD, or a PDP, displays still images at a rate of 30 to 60 frames per second, so a viewer is capable of recognizing the same as a video.

As the light emitting diode (LED) becomes smaller in size, an observer can enjoy more natural images. However, as the light emitting diode (LED) becomes smaller in size, it is necessary to continuously provide more still images per second. To this end, it is necessary to rotate a rotary portion at a high speed. However, as the rotation speed of the rotary portion increases, wireless data reception using RF communication (e.g., Wi-Fi, Bluetooth) decreases. Therefore, there is a problem in wireless transmission of image signals to a rotary portion rotating at a high speed.

DISCLOSURE

Technical Problem

An object of the present disclosure is to provide a rotating display device (hereinafter referred to as a rotary display device) capable of providing high-resolution images in real time.

Another object of the present disclosure is to provide a rotary display device capable of providing image signals to a rotary portion rotating at a high speed.

Another object of the present disclosure is to provide a rotary display device capable of preventing deterioration in sensitivity of an image signal to be transmitted to the rotary portion rotating at a high speed.

Another object of the present disclosure is to provide a rotary display device capable of reducing noise of a peripheral circuit that affects an image signal wirelessly provided to the rotary portion.

Furthermore, according to another object of the present disclosure, there are additional problems not mentioned herein. Those skilled in the art will appreciate such problems through the whole of the specification and drawings.

Technical Solutions

In accordance with an aspect of the present disclosure, a rotary display device includes a fixed portion and a rotary portion connected to the fixed portion to rotate. The fixed portion may include a motor for rotationally driving the rotary portion; an input unit for receiving image data; and a light emitting unit for emitting an optical signal corresponding to the image data. The rotary portion may include a light receiving unit provided on a rotary shaft of the motor to receive the optical signal; and a light source module configured to output the image received as the optical signal.

In accordance with one embodiment, the fixed portion may include: a first fixed portion having the motor and provided at one side of the rotary portion with respect to the rotary shaft; a second fixed portion having the light emitting unit and provided at the other side of the rotary portion; and a transparent frame configured to interconnect the first fixed portion and the second fixed portion, and provided to surround the rotary portion.

In accordance with one embodiment, the fixed portion may further include a conversion unit configured to serially convert the image data in order to transmit the optical signal as the optical signal, and the rotary portion may further include a restoration unit configured to parallel-convert the optical signal in order to restore the optical signal to the image data.

In accordance with one embodiment, the first fixed portion may include the input unit and the conversion unit; and the transparent frame may further include a connection wire for transmitting the image data serially converted by the conversion unit to the light emitting unit.

In accordance with one embodiment, the second fixed portion may include the input unit and the conversion unit, wherein the input unit wirelessly receives the image data.

In accordance with one embodiment, the light emitting unit may include: at least one light emitting diode (LED) configured to convert an electrical signal into the optical signal; and a driver configured to drive the light emitting diode (LED). The light receiving unit may include: a light receiving element configured to convert the optical signal into an electrical signal; and an amplifier configured to convert a signal received by the light receiving element. The light emitting diode (LED) may be provided on an extension line of the rotary shaft, and may be spaced apart from the light receiving element by a predetermined distance to face the light receiving element.

In accordance with one embodiment, the rotary display device may further include: a cover member fixed to the second fixed portion or the rotary portion, and provided to surround the light emitting diode (LED) and the light receiving element, thereby blocking ambient light from being applied to the light receiving element.

In accordance with one embodiment, the cover member may be configured such that one end thereof is fixed to one of the second fixed portion and the rotary portion and the other end thereof has a bearing and is connected to the other one of the second fixed portion and the rotary portion.

In accordance with one embodiment, the rotary portion may include: a connection frame configured to rotate while being connected to the motor; a side frame vertically provided at an end portion of the connection frame and including the light source module; a shaft frame provided on the connection frame along the rotary shaft and including the light receiving element and the cover member at an end portion thereof; and an extension frame configured to extend from the side frame in a direction of the rotary shaft, and connected to the shaft frame or the cover member.

In accordance with one embodiment, the fixed portion may communicate with the rotary portion through a hollow rotary shaft connected to the motor; and the light emitting unit may emit the optical signal to the light receiving unit using a hollow portion of the hollow rotary shaft.

Advantageous Effects

As is apparent from the above description, the rotary display device according to one embodiment of the present disclosure may provide a high-resolution image in real time.

The rotary display device according to one embodiment may provide an image signal to a rotary portion rotating at a high speed.

The rotary display device according to one embodiment may prevent deterioration in sensitivity of an image signal that is transmitted to a rotary portion rotating at a high speed.

The rotary display device according to one embodiment may reduce noise of a peripheral circuit that affects an image signal wirelessly provided to the rotary portion.

Furthermore, according to another embodiment of the present disclosure, there are additional technical effects not mentioned herein. Those skilled in the art will appreciate such technical effects through the whole of the specification and drawings.

BEST MODE

Reference will now be made in detail to embodiments of the present disclosure, examples of which are illustrated in the accompanying drawings. Wherever possible, the same reference numbers will be used throughout the drawings to refer to the same or like parts, and a redundant description thereof will be omitted. As used herein, the suffixes "module" and "unit" are added or used interchangeably to facilitate preparation of this specification, and are not intended to suggest distinct meanings or functions. In describing embodiments disclosed in this specification, relevant well-known technologies may not be described in detail in order to avoid obscuring the subject matter of the embodiments disclosed in this specification. In addition, it should be noted that the accompanying drawings are only for easy understanding of the embodiments disclosed in the present specification, and should not be construed as limiting the technical spirit disclosed in the present specification.

Furthermore, although the drawings are separately described for simplicity, embodiments implemented by combining two or more drawings are also within the scope of the present disclosure.

In addition, when an element such as a layer, a region, or a substrate is described as being "on" another element, it is to be understood that the element may be directly on the other element, or there may be an intermediate element between them.

The display device described herein conceptually includes all display devices that display information with a unit pixel or a set of unit pixels. Therefore, the term "display device" may be applied not only to finished products but also to parts. For example, a panel corresponding to a part of a digital TV also independently corresponds to the display device in the present specification. Such finished products include a mobile phone, a smartphone, a laptop computer, a digital broadcasting terminal, a personal digital assistant (PDA), a portable multimedia player (PMP), a navigation system, a slate PC, a tablet PC, an Ultrabook, a digital TV, a desktop computer, and the like.

However, it will be readily apparent to those skilled in the art that the configuration according to the embodiments described herein is also applicable to new products to be developed later as display devices.

In addition, the term "semiconductor light-emitting element" mentioned in this specification conceptually includes an LED, a micro LED, and the like, and may be used interchangeably therewith.

Figure 1:
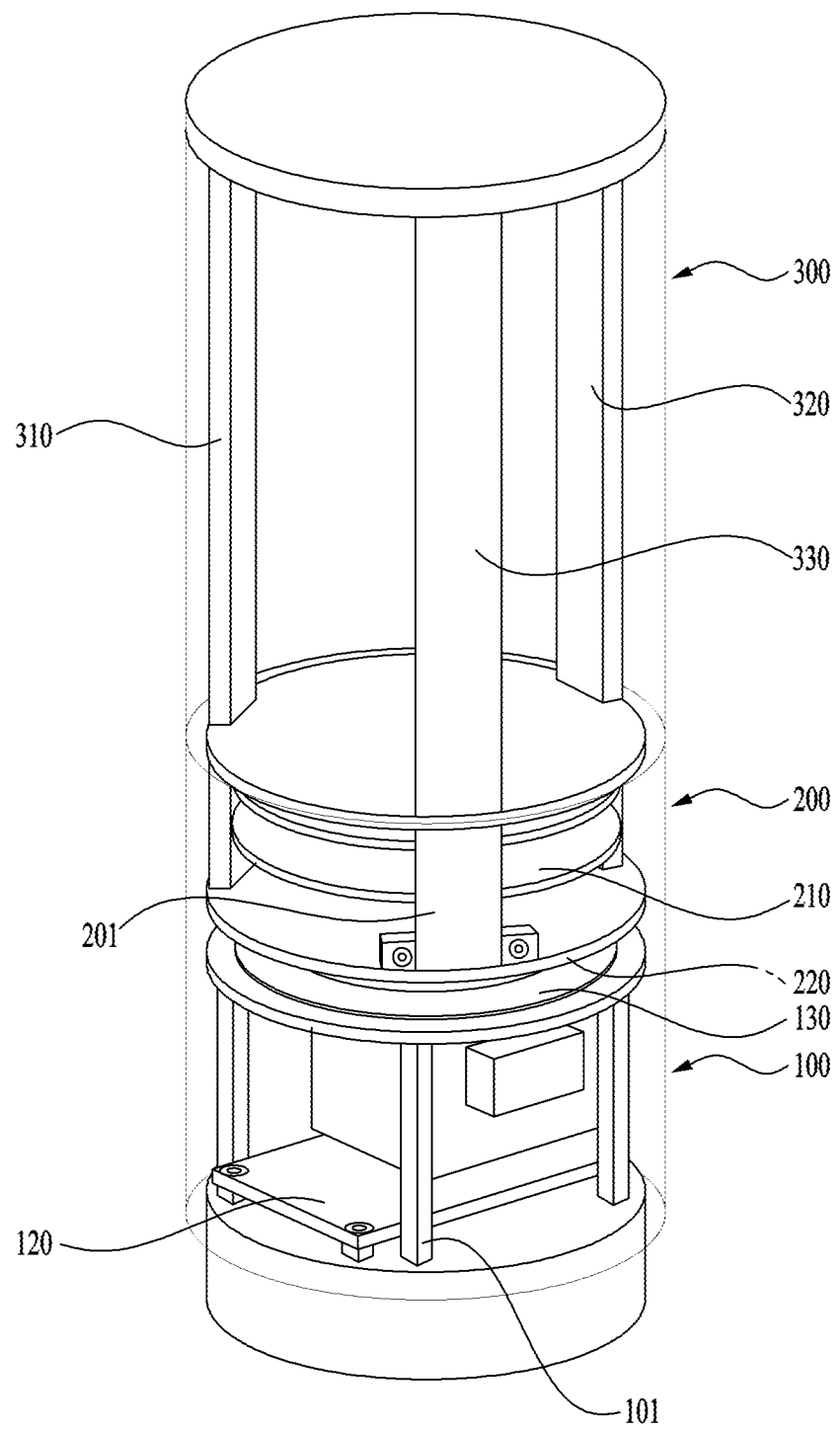
FIG. 1 is a perspective view of a rotating display device according to a first embodiment of the present disclosure.

FIG. 1 is a perspective view of a rotating display device according to an embodiment of the present disclosure.

FIG. 1 illustrates a cylindrical-shaped rotating display device in which light-emitting element arrays 311 (refer to FIG. 2) are provided on one or more panels 310, 320, and 330, which are disposed along a cylindrical surface, in the longitudinal direction of each of the panels.

Such a rotating display device may broadly include a fixed portion 100, which includes a motor 110 (refer to FIG. 6), a rotary portion 200, which is located on the fixed portion 100 and is rotated by the motor 110, and a light source module 300, which is coupled to the rotary portion 200 and includes the light-emitting element arrays 311 mounted on the panels 310, 320, and 330 so as to be implemented as a display by creating an afterimage resulting from rotation.

In this case, the light source module 300 may include the light-emitting element arrays 311, which are mounted on one or more bar-shaped panels 310, 320, and 330, which are arranged at regular intervals on the outer circumferential surface of the cylinder in the longitudinal direction of each of the panels.

Referring to FIG. 1, the light source module 300 may include three panels 310, 320, and 330, on which the light-emitting element arrays 311 (hereinafter, first light-emitting element arrays) are provided. However, this is given merely by way of example, and the light source module 300 may include one or more panels.

In the first light-emitting element arrays 311, individual pixels may be disposed on the panels 310, 320, and 330 in the longitudinal direction of each of the panels. In this case, subpixels constituting the individual pixels may be disposed in a direction perpendicular to the longitudinal direction.

In addition, the subpixels may sequentially emit light in the individual pixels.

A detailed description of the first light-emitting element arrays 311 provided in the light source module 300 will be given later.

Each of the panels 310, 320, and 330 constituting the light source module 300 may be configured as a printed circuit board (PCB). That is, each of the panels 310, 320, and 330 may have the function of a printed circuit board. Each of the light-emitting element arrays may be implemented as an individual unit pixel, and may be disposed on a corresponding one of the panels 310, 320, and 330 in the longitudinal direction of the corresponding panel.

The panels provided with the light-emitting element arrays may be implemented as a display using an afterimage created by rotation thereof. Implementation of an afterimage display will be described later in detail.

As described above, the light source module 300 may be constituted by a plurality of panels 310, 320, and 330. However, the light source module 300 may be constituted by a single panel provided with a light-emitting element array. When the light source module 300 is constituted by a plurality of panels, as illustrated in FIG. 1, the plurality of panels may realize one frame image in a shared manner, and may thus be rotated at a lower speed when realizing a given frame image.

Meanwhile, the fixed portion 100 may include a frame structure. That is, the fixed portion 100 may include a plurality of frames 101, which are separately provided and are coupled to each other.

This frame structure may provide a space in which the motor 110 is mounted, and may provide a space in which a power supply 120, an RF module 126 (refer to FIG. 6), a controller (124; refer to FIG. 6), and the like are mounted.

In addition, a weight (not shown) may be mounted to the fixed portion 100 in order to reduce the influence of high-speed rotation of the rotary portion 200.

Similarly, the rotary portion 200 may include a frame structure. That is, the rotary portion 200 may include a plurality of frames 201, which are provided separately and are coupled to each other.

This frame structure may provide a space in which a driving circuit 210 for driving the light-emitting element arrays 311 in order to implement a display is mounted.

In this case, the driving shaft of the motor 110 may be fixed to a shaft-fixing portion (not shown) formed at the frame 201 of the rotary portion 200. In this way, the driving shaft of the motor 110 and the center of rotation of the rotary portion 200 may be coaxially located.

Further, the light source module 300 may be fixedly mounted on the frame 201.

Meanwhile, the fixed portion 100 and the rotary portion 200 may transfer power therebetween in a wireless power transfer manner. To this end, a transmission coil 130 for transferring wireless power may be mounted to an upper portion of the fixed portion 100, and a reception coil 220 may be mounted to a lower portion of the rotary portion 200 so as to be located at a position facing the transmission coil 130.

Figure 2:
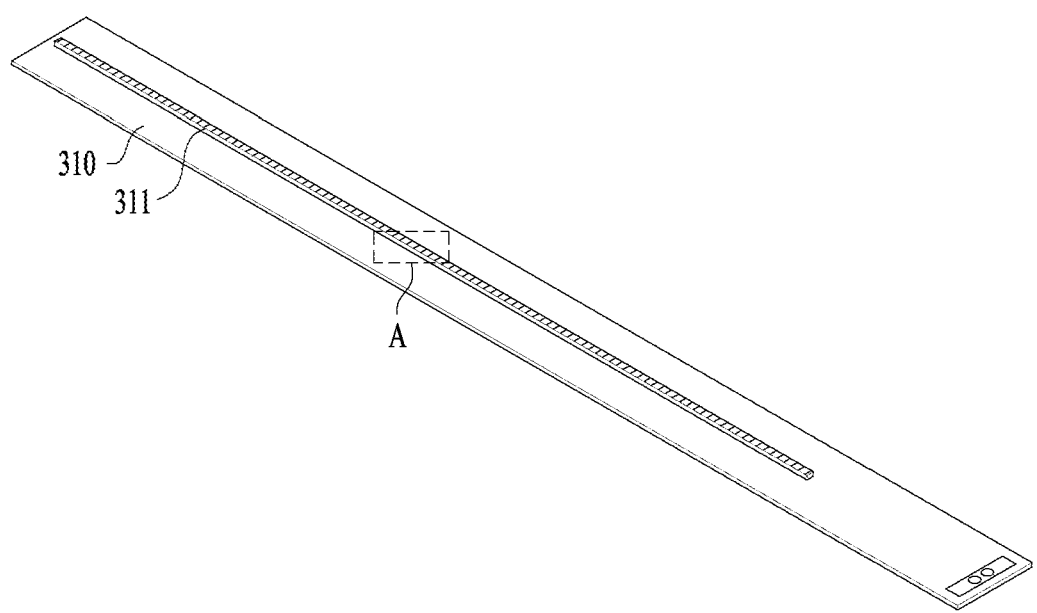
FIG. 2 is a perspective view showing the front surface of a light source module according to the present disclosure.
Figure 3:
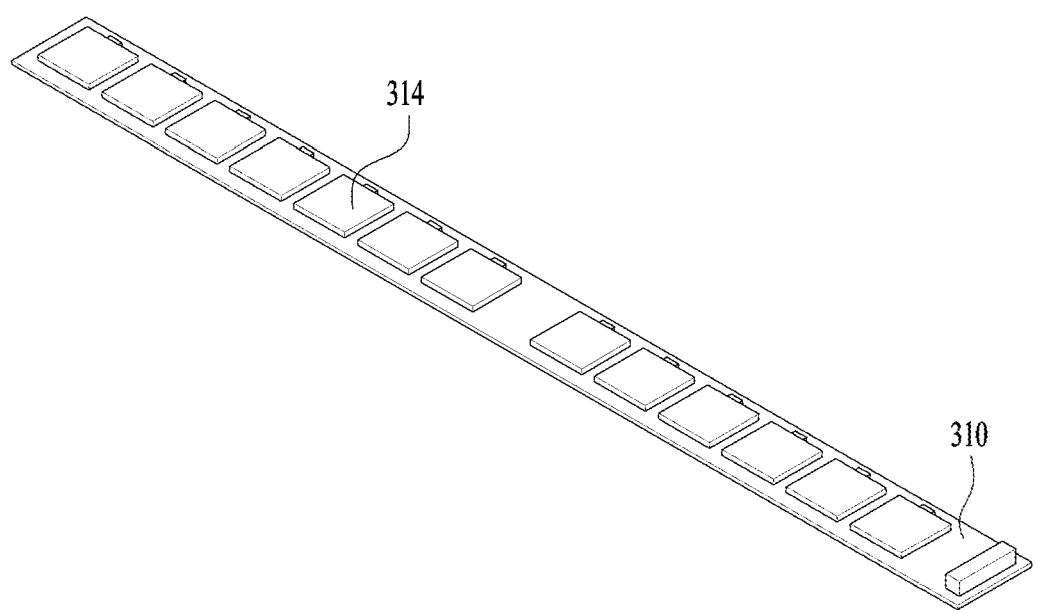
FIG. 3 is a perspective view showing the rear surface of the light source module according to the present disclosure.

FIG. 2 is a perspective view showing the front surface of the light source module according to the present disclosure, and FIG. 3 is a perspective view showing the rear surface of the light source module according to the present disclosure.

Although FIGS. 2 and 3 illustrate the first panel 310 of the first embodiment as an example, the configuration illustrated in FIGS. 2 and 3 may also be identically applied to the other panels 320 and 330.

FIG. 2 illustrates one panel 310 forming the light source module 300. As mentioned above, the panel 310 may be a printed circuit board (PCB). A plurality of light-emitting elements 312 (refer to FIG. 4) may be mounted on the panel 310 so as to be disposed in one direction to form pixels, thereby constituting the light-emitting element array 311. Here, a light-emitting diode (LED) may be used as the light-emitting element.

That is, the light-emitting elements 312 are disposed in one direction on one panel 310 to form individual pixels, with the result that the light-emitting element array 311 may be provided so as to be linearly mounted.

FIG. 3 illustrates the rear surface of the panel 310. Drivers 314 for driving the light-emitting elements 312 may be mounted on the rear surface of the panel 310, which constitutes the light source module.

Since the drivers 314 are mounted on the rear surface of the panel 310, as described above, the drivers 314 may not interfere with a light-emitting surface, the influence on light emission from the light sources (the light-emitting elements) 312 due to interference may be minimized, and the area of the panel 310 may be minimized. The panel 310, having a small area, may improve the transparency of the display.

Meanwhile, the front surface of the panel 310, on which the light-emitting element array 311 is mounted, may be processed into a dark color (e.g. black) in order to improve the contrast ratio and the color expression of the display, thereby maximizing the effect of the light sources.

Figure 4:
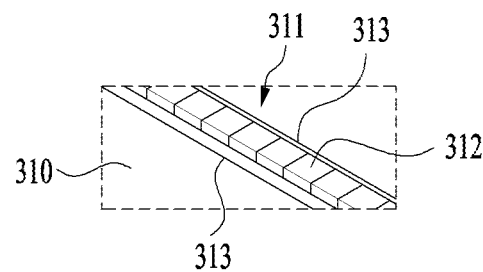
FIG. 4 is an enlarged view of portion A in FIG. 3.
Figure 5:
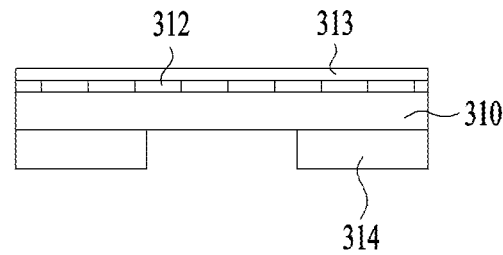
FIG. 5 is a plan view illustrating a pixel structure of a rotary display device according to an exemplary embodiment of the present disclosure.

FIG. 4 is an enlarged view of portion A in FIG. 3, and FIG. 5 is a planar view illustrating a pixel structure of a rotating display device according to a second embodiment of the present disclosure.

Referring to FIG. 4, it can be seen that the individual light-emitting elements 312 are mounted linearly in one direction (the longitudinal direction of the panel). In this case, a protective portion 313 may be located outside the light-emitting elements 312 in order to protect the light-emitting elements 312.

Red, green, and blue light-emitting elements 312 may form one pixel in order to realize natural colors, and the individual pixels may be mounted in one direction on the panel 310.

Referring to FIG. 5, the light-emitting elements 312 may be protected by the protective portion 313. Further, as described above, the drivers 314 may be mounted on the rear surface of the panel 310, and may drive the light-emitting elements 312 in units of pixels or subpixels. In this case, one driver 314 may individually drive at least one pixel.

Figure 6:
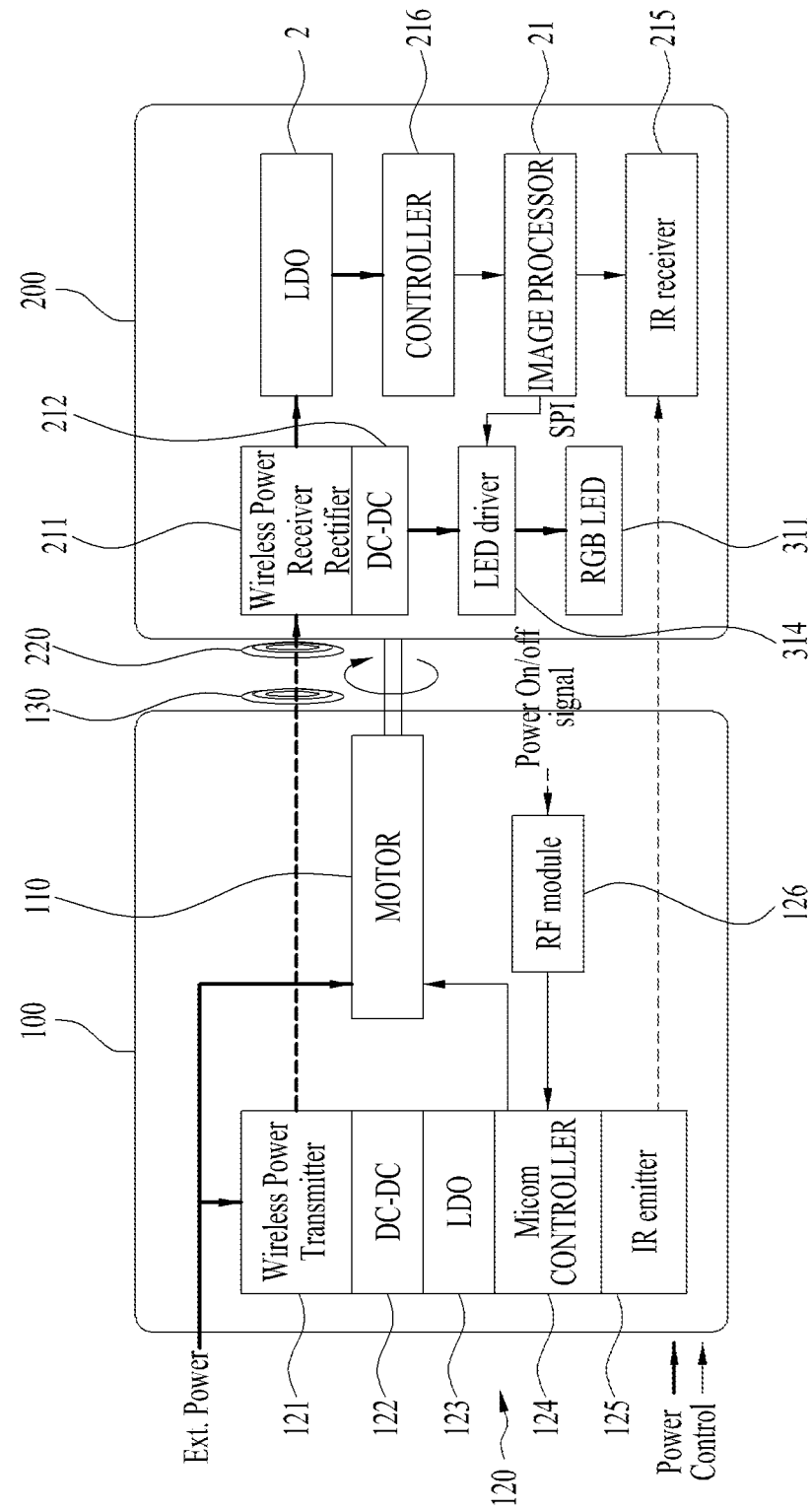
FIG. 6 is a block diagram illustrating a rotary display device according to an exemplary embodiment of the present disclosure.

FIG. 6 is a block diagram illustrating a rotary display device according to an exemplary embodiment. Hereinafter, a configuration for driving the rotary display device will be briefly described with reference to FIG. 6. A detailed description of the same configuration as described above will herein be omitted for brevity.

First, a driving circuit 210 may be mounted to the fixed portion 100. The driving circuit 120 may include a power supply. The driving circuit 120 may include a wireless power transmitter 121, a DC-DC converter 122, and a voltage generator 123 for supplying individual voltages.

External power may be supplied to the driving circuit 120 and the motor 110.

In addition, an RF module 126 may be provided at the fixed portion 100, so that the display may be driven in response to a signal transmitted from the outside.

Meanwhile, a means for sensing rotation of the rotary portion 200 may be provided at the fixed portion 100. Infrared radiation may be used to sense rotation. Accordingly, an IR emitter 125 may be mounted to the fixed portion 100, and an IR receiver 215 may be mounted to the rotary portion 200 at a position corresponding to the IR emitter 125.

In addition, a controller 124 may be provided at the fixed portion 100 in order to control the driving circuit 120, the motor 110, the IR emitter 125, and the RF module 126.

Meanwhile, the rotary portion 200 may include a wireless power receiver 211 for receiving a signal from the wireless power transmitter 121, a DC-DC converter 212, and a voltage generator (LDO) 213 for supplying individual voltages.

The rotary portion 200 may be provided with an image processor 216 in order to realize an image through the light-emitting element array using RGB data of an image to be displayed. The signal processed by the image processor 216 may be transmitted to the drivers 314 of the light source module, and thus an image may be realized.

In addition, a controller 214 may be mounted to the rotary portion 200 in order to control the wireless power receiver 211, the DC-DC converter 212, the voltage generator (LDO) 213, the IR receiver 215, and the image processor 216.

The image processor 216 may generate a signal for controlling light emission from the light sources of the light source module based on data of an image to be output. At this time, the data for light emission from the light source module may be internal data or external data.

The data stored in the internal device (the rotary portion 200) may be image data pre-stored in a storage device, such as a memory (an SD-card) mounted together with the image processor 216. The image processor 216 may generate a light emission control signal based on the internal data.

Meanwhile, the image processor 216 may receive image data from the fixed portion 100. At this time, external data may be output through an optical data transmission device, such as a photo coupler, or an RF-type data transmission device, such as a Bluetooth or Wi-Fi device.

In this case, as mentioned above, a means for sensing rotation of the rotary portion 200 may be provided. That is, the IR emitter 125 and the IR receiver 215 may be provided as a means for detecting the rotational position (speed) of the rotary portion 200, such as an absolute rotational position or a relative rotational position, in order to output light source data suitable for each rotational position (speed) during rotation of the rotary portion 200. Alternatively, this function may also be achieved using an encoder, a resolver, or a Hall sensor.

Meanwhile, data required to drive the display may be transmitted as a signal in an optical manner at low cost using the principle of a photo coupler. That is, if the fixed portion 100 and the rotary portion 200 are provided with a light emitter and a light receiver, reception of data is continuously possible even when the rotary portion 200 rotates. Here, the IR emitter 125 and the IR receiver 215 described above may be used to transmit data.

As described above, power may be transferred between the fixed portion 100 and the rotary portion 200 in a wireless power transfer (WPT) manner.

Wireless power transfer enables the supply of power without connection of a wire using a resonance phenomenon of a coil.

To this end, the wireless power transmitter 121 may convert power into an RF signal of a specific frequency, and a magnetic field generated by current flowing through the transmission coil 130 may generate an induced current in the reception coil 220.

At this time, the natural frequency of the coil and the transmission frequency for transferring actual energy may differ from each other (a magnetic induction method).

Meanwhile, the resonant frequencies of the transmission coil 130 and the reception coil 220 may be the same (a magnetic resonance method).

The wireless power receiver 211 may convert the RF signal input from the reception coil 220 into direct current, and may transmit required power to a load.

Figure 7:
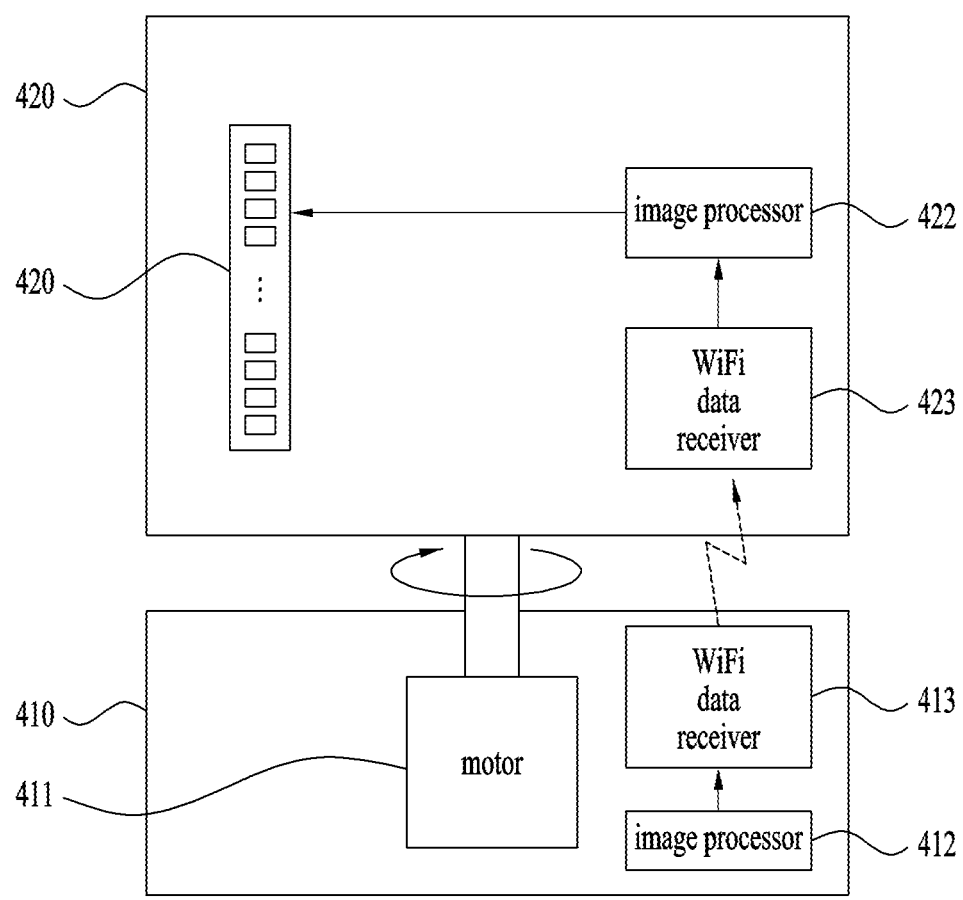
FIG. 7 is a conceptual diagram illustrating a rotary display device for transmitting and receiving an image signal using radio frequency (RF) communication.
Figure 8:
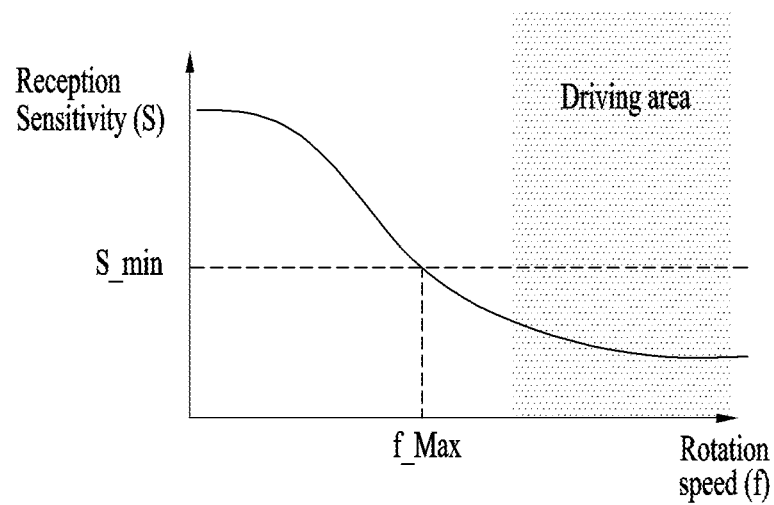
FIG. 8 is a graph illustrating the relationship between sensitivity of RF data reception using RF communication and a rotation speed of a rotary portion according to the present disclosure.

FIG. 7 is a conceptual diagram illustrating a rotary display device for transmitting and receiving an image signal using RF communication. FIG. 8 is a graph illustrating the relationship between sensitivity of RF data reception using RF communication and a rotation speed of a rotary portion according to the present disclosure.

Referring to FIG. 7, the rotary display device may include a fixed portion 410 and a rotary portion 420 that rotates while being connected to the fixed portion 410.

The fixed portion 410 may include a motor 411 for rotating the rotary portion 420, an image input unit 412 for receiving an image, and a signal transmitter 413 for transmitting the received image to the rotary portion 420.

The fixed portion 471 of FIG. 7 is shown as a schematic conceptual diagram. Referring to FIG. 7, the fixed portion 471 may further include at least one of a wireless power transmitter 121, a DC-DC converter 122, a voltage generator (LDO) 123, a controller 124, an infrared (IR) emitter 125, an RF module 126, and a transmission coil 130. In FIG. 7, the same constituent elements as those of FIG. 6 will be described with reference to FIG. 6.

The rotary portion 420 may include a light source module 421, an image processor 422 for processing the image signal to be provided to the light source module 421, and a signal receiver 423 for receiving the image signal from the signal transmitter 413.

Similarly, the rotary portion 420 of FIG. 7 is shown as a schematic conceptual diagram. The rotary portion 420 may further include at least one of a wireless power receiver 211, a DC-DC converter 212, a voltage generator (LDO), a controller 214, an infrared (IR) receiver 215, and a reception coil 220. In FIG. 7, the same constituent elements as those of FIG. 6 will be described with reference to FIG. 6.

Image data input to the fixed portion 410 may be wirelessly transmitted to the rotary portion 420 using the transmitter 413 and the receiver 422. At this time, transmission and reception of image signals can be implemented using RF communication (e.g., Wi-Fi, Bluetooth). Here, the image data can be externally acquired through a memory (not shown) provided in the fixed portion 410 or a wired/wireless communication unit (not shown).

When the image signal is transmitted from the fixed portion 410 to the rotary portion 420 using RF communication, a rotation speed of the rotary portion 420 may affect transmission and reception of the image signal. Specifically, when the rotary portion 420 rotates at a high speed, there occurs a problem in that reception sensitivity of the image signal is deteriorated.

Referring to FIG. 8, when the signal receiver 423 receives an image signal using RF communication, it can be seen that the sensitivity (S) of receiving the image signal decreases in proportion to the increasing rotation speed (0 of the rotary portion 420.

Specifically, the signal receiver 423 provided in the rotary portion 420 rotates at the rotation speed (0 of the rotary portion 420. Here, as the rotation speed (0 increases, a frequency of the image signal transmitted through RF communication is distorted and received. The signal receiver 422 receives a signal obtained by adding or subtracting the rotation speed (0 to or from the frequency of the image signal according to a phase. As the rotation speed (0 increases, distortion of the image signal may increase.

A conventional rotary display device controls the rotary portion 420 to rotate at a low speed so that the conventional rotary display device can receive image signals using RF communication. Specifically, in a situation where the rotary portion 420 is driven at a low speed because each of the light emitting diodes (LEDs) included in the light source module 421 has a large size and the number of panels (see 310, 320, and 330 of FIG. 1) constituting the light source module 421 increases, the conventional rotary display device can implement images using afterimages.

However, in recent years, in order for the conventional rotary display device to implement a smooth image with a higher image quality, miniaturized LEDs (e.g., micro-LEDs) are being used to constitute the light source module 421, and the number of panels 310, 320, and 330 contained in the light source module 421 is being reduced in terms for reduction of production costs.

In accordance with this trend, as the size of the light emitting device used in the light source module 421 decreases and the number of panels 310, 320, and 330 constituting the light source module 421 decreases, the rotary portion 420 needs to rotate at a high speed. In this case, there are disadvantages in that the rotation speed (f) of the rotary portion 420 within the region where the rotary display device is driven exceeds a maximum rotation speed (f_max) that satisfies a minimum sensitivity (S_min) for enabling the signal transmitter 423 to distinguish the image signal transmitted using RF communication.

A rotary display device for addressing the above-described issues of image signals using RF communication will hereinafter be described.

Figure 9:
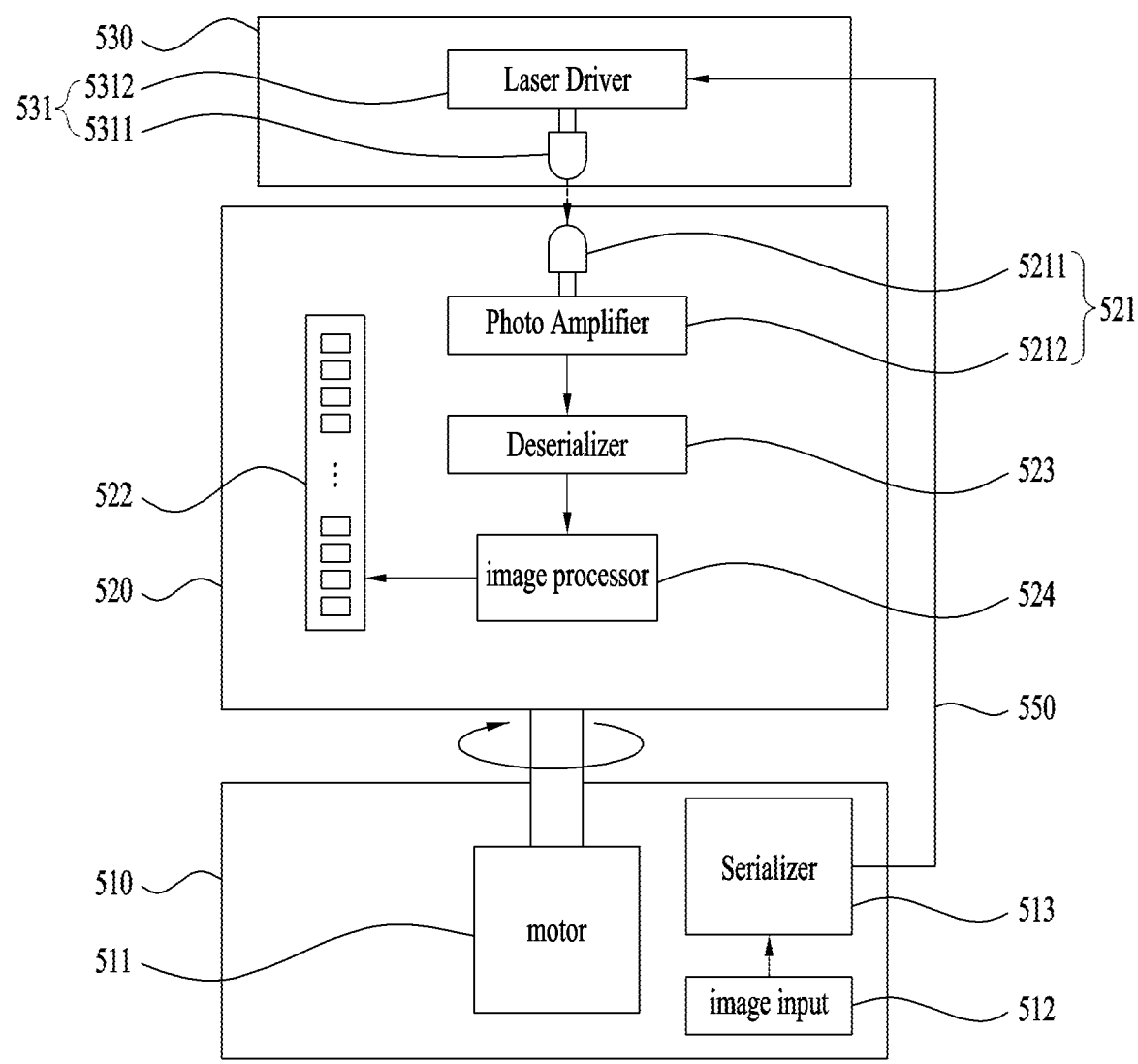
FIG. 9 is a conceptual diagram illustrating a rotary display device for transmitting and receiving an image signal using an optical signal.
Figure 10:
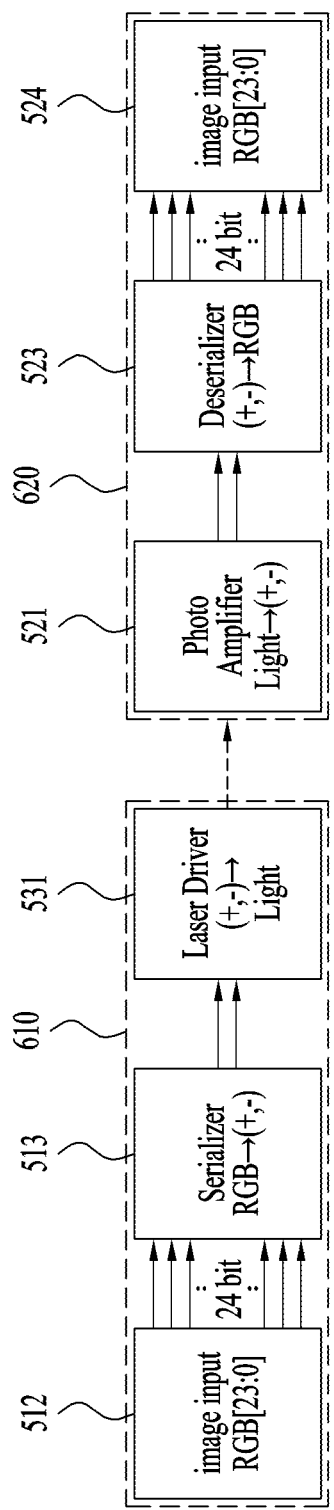
FIG. 10 is a block diagram illustrating a processor for transmitting and receiving image data using an optical signal.

FIG. 9 is a conceptual diagram illustrating a rotary display device for transmitting and receiving an image signal using an optical signal. FIG. 10 is a block diagram illustrating a processor for transmitting and receiving image data using an optical signal.

Referring to FIG. 9, the rotary display device may include fixed portions 510 and 530 and a rotary portion 520 that rotates while being connected to the fixed portions 510 and 530.

The fixed portions 510 and 530 may include a motor 511 configured to rotate the rotary portion 520, an input unit 512 configured to receive image data, and a light emitting unit 531 for emitting an optical signal corresponding to image data.

The motor 511 may be connected to the rotary portion 520 through a rotary shaft. The rotary shaft 511 of the motor may be a hollow rotary shaft, and an embodiment related thereto will hereinafter be described in detail with reference to FIG. 9.

The input unit 512 may receive image data by wire or wirelessly. In some cases, the rotary display device may include a memory (not shown) for storing image data on behalf of or together with the input unit 512.

The light emitting unit 531 may transmit image data received through the input unit 512 to the rotary portion 520 or may convert image data stored in the memory into image data and transmit the resultant image data to the rotary portion 520. The light emitting unit 531 may include at least one light emitting diode (LED) 5311 for converting an electrical signal into an optical signal and a driver 5312 for driving the light emitting diode (LEDs).

Each of the fixed portions 510 and 530 may further include a converter 513 that serially converts image data in order to transmit the image data as an optical signal. A processor for serially converting the image data and transmitting the resultant data to the rotary portion 520 will hereinafter be described with reference to FIG. 10.

The fixed portions 510 and 530 may be classified into a first fixed portion 510 provided at one side of the rotary portion 520 based on the rotary shaft and a second fixed portion 530 provided at the other side based on the rotary shaft. The first fixed portion 510 may include the motor 511, and the second fixed portion 530 may include a light emitting unit 5341. In this case, the input unit 512 and the converter 513 may be provided either in the first fixed portion 510 (first embodiment) or in the second fixed portion 530 (second embodiment). The first embodiment will be described in detail with reference to FIG. 11, and the second embodiment will be described in detail with reference to FIG. 12.

Additionally, the fixed portions 510 and 530 may further include at least one of the wireless power transmitter 121, the DC-DC converter 122, the voltage generator (LDO) 123, the controller 124, the infrared (IR) emitter 125, an RF module 126, and the transmission coil 130. The same constituent elements as those of FIG. 6 will be described with reference to FIG. 6.

The rotary portion 520 may include a light receiving unit 521 provided on the rotary shaft of the motor 511 to receive an optical signal emitted by the light emitting unit 531, and a light source module 522 that outputs the received image data as an optical signal.

The light receiving unit 521 may include a light receiving element 5211 for converting an optical signal into an electrical signal, and an amplifier 5212 for amplifying the electrical signal received by the light receiving unit 5211.

The light source module 522 may be configured to include a plurality of light emitting diodes (LEDs), and may correspond to the panel 310 shown in FIG. 2.

The rotary portion 520 may further include a restoration unit 523 that parallel-converts the optical signal to restore image data. A processor for restoring image data through parallel conversion of the optical signal will be described in detail with reference to FIG. 10.

The rotary portion 520 may further include an image processor 524 for processing image data to be output to the light source module 522. The image processor 524 may control the flickering color, speed, and phase of light emitting diodes (LEDs) included in the light source module 522 so that the light source module 522 rotates to output an image as an afterimage.

Additionally, the rotary portion 520 may include at least one of the wireless power receiver 211, the DC-DC converter 212, the voltage generator (LDO), the controller 214, the infrared (IR) receiver 215, and the reception coil 220 shown in FIG. 6. A detailed description of the same configuration as those of FIG. 6 will herein be omitted for brevity.

Hereinafter, a processor for transmitting image data as an optical signal will be described with reference to FIG. 10.

A processor for transmitting image data as an optical signal may include a first processor 610 for converting image data into an optical signal and a second processor 620 for restoring the optical signal to image data. The first processor 610 may control a process to be performed in the fixed portions 510 and 530. The second processor 620 may control a process to be performed in the rotary portions 510 and 520.

In the first processor 610, the input unit 512 may receive image data, and may transmit the image data as a parallel signal to the converter 513. The image data may be constructed such that red (R), green (G), and blue (B) data needed for image implementation are arranged in the form of a parallel signal and the image data implemented as the parallel signal including the red (R), green (G), and blue (B) data can be transmitted to the conversion unit 513. In this case, each of the red (R) data, the green (G) data, and the blue (B) data may also be constructed in the form of a parallel signal in response to the positions of the respective pixels so that the resultant parallel signal can be transmitted to the conversion unit 513. The conversion unit 513 may convert the plurality of image data (input as parallel signals) into serial signals by chronologically ordering the plurality of image data corresponding to RGB data. For example, red (R) data, green (G) data, and blue (B) data can be serialized in chronological order (in order of time), and each of the red (R) data, the green (G) data, and the blue (B) data can be serialized in response to the position of a pixel. The image data serialized by the conversion unit 513 can be transmitted to the light emitting unit 531. The light emitting unit 531 may emit an optical signal in response to the serialized image data.

In the second processor 620, the light receiving unit 521 may receive an optical signal. The light receiving unit 521 may convert the optical signal into an electrical signal, and amplify the electrical signal. The light receiving unit 521 may transmit serialized image data to the restoration unit 523. The restoration unit 523 may restore image data received in chronological order in response to red (R) data, green (G) data, and blue (B) data. The image data reconstructed by the restoration unit 523 may be transmitted to the image processor 524, and the image processor 524 may process the image data in consideration of the rotation speed and phase of the rotary portion 520 and then transmit the processed image data to the light source module 522.

Whereas the second processor 620 is driven by the rotary portion 520, the driving modules 510 and 530 are classified into the first driving module 510 and the second driving module 530, so that the first processor 610 can also be driven separately. Hereinafter, the first and second embodiments will be described in detail.

Figure 11:
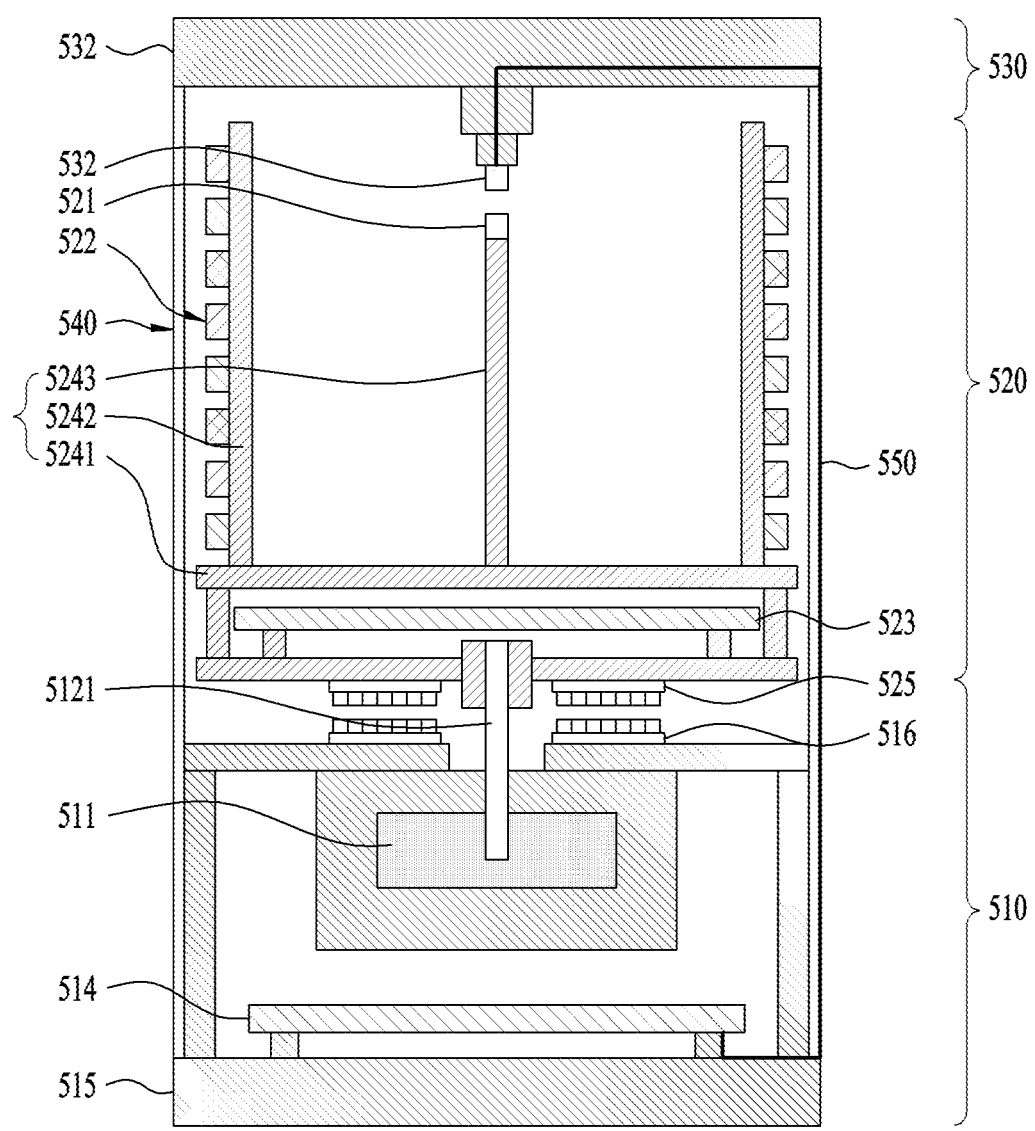
FIG. 11 illustrates a first embodiment of the rotary display device shown in FIG. 9.

FIG. 11 illustrates the first embodiment of the rotary display device shown in FIG. 9. In FIG. 11, for a description of the same configuration as those of FIG. 9, refer to FIG. 9.

The fixed portions 510 and 530 may be classified into a first fixed portion 510 provided at one side of the rotary portion 520 and a second fixed portion 530 provided at the other side of the rotary portion 520. In addition, the first fixed portion 510 and the second fixed portion 530 may be fixed by a transparent frame 540 provided around the rotary portion 520.

The first fixed portion 510 may include a motor 511 for rotationally driving the rotary portion 520, and a first printed circuit board (PCB) 514. In addition, the first fixed portion 510 may be structured such that the first fixed frame 515 in which the motor 511 and the first PCB 514 are mounted can form a body, and the first fixed portion 510 may include a transmission coil 516 for wirelessly supplying power to the rotary portion 520.

The first PCB 514 may include the input unit 512 and the conversion unit 513 shown in FIG. 9. In some cases, the first PCB 514 may be implemented as a plurality of substrates as needed. The input unit 512 and the conversion unit 513 may be provided on the first PCB 514 as one chip or different chips.

Here, the first PCB 514 may further include at least one of the wireless power transmitter 121, the DC-DC converter 122, the voltage generator (LDO) 123, the controller 124, the infrared (IR) emitter 125, and the RF module 126 shown in FIG. 6, or may be connected to the above-described constituent elements. The same constituent elements as those of FIG. 6 will be described with reference to FIG. 6.

The second fixed portion 530 may include a light emitting unit 531. Additionally, the second fixed portion 530 may include a second fixed frame 532 that includes the light emitting unit 531 mounted therein and covers the other side of the rotary portion 520.

The light emitting unit 531 may be provided to face the light receiving unit 521 included in the rotary portion 520. Specifically, the light emitting diode (LED) of the light emitting unit 531 may be provided to face the light receiving element of the light receiving unit 521. In this case, the light emitting diode (LED) and the light receiving element may be spaced apart from each other by a predetermined distance.

The transparent frame 540 may be formed in a cylindrical shape surrounding the rotary portion 520 and connect the first fixed portion 510 and the second fixed portion 530 to each other. At this time, the transparent frame 540 may include a connection wire 550 for electrically connecting the first PCB 514 provided in the first fixed portion 510 to the light emitting unit 531 provided in the second fixed portion 530.

Image data may be converted into a serial signal in the first fixed portion 510, and the serial signal may be transmitted to the light emitting unit 531 through the connection wire 550. When image data formed into a parallel signal is transmitted to the second fixed portion 530, as many connection wires 550 as the number of channels should be used.

Since the connection wires 550 may interfere with a field of view (FOV) of an observer who observes the image being output to the rotary portion 520 in all directions, it is more advantageous in that only one connection wire rather than multiple connection wires is used.

In some cases, the connection wire 550 may be a metal wire made of a transparent material. However, a metal wire made of a transparent material may not be suitable for transmitting image data in that a loss due to internal resistance is large. Accordingly, the metal wire made of a transparent material may be used to supply power from the first fixed portion 510 to the second fixed portion 530. That is, the connection wire 550 may include a first conducting wire for transmitting image data and a second conducting wire for supplying power. In this case, a general conducting wire having a low internal resistance may be used as the first conducting wire, and a metal conductor made of a transparent material may be used as the second conducting wire.

The rotary portion 520 may include a light receiving unit 521 that is provided on the rotary shaft 5121 of the motor 511 to receive the optical signal emitted by the light emitting unit 531, and a light source module 522 that outputs the received image data as an optical signal. The rotary portion 520 may further include at least one of the second PCB 523 for controlling the light source module 522, the rotation frame 524 constituting the body of the rotary portion 520, and the reception coil 525 for wirelessly receiving power.

The light receiving unit 521 may include a light receiving element 5211 for converting an optical signal into an electrical signal, and an amplifier 5212 for amplifying the electrical signal received by the light receiving element 5211.

The light source module 522 may be configured to include a plurality of light emitting diodes (LEDs), and may be a component corresponding to the panel 310 shown in FIG. 2.

The second PCB 523 may include the restoration unit 523 and the image processor 524 described in FIG. 9. In some cases, the second PCB 523 may be implemented as a plurality of substrates as needed. The restoration unit 523 and the image processor 524 may be implemented as different chips and provided in the second PCB 523.

Additionally, the second PCB 523 may further include at least one of the wireless power transmitter 211, the DC-DC converter 212, the voltage generator (LDO), the controller 214, the infrared (IR) receiver 215, and the reception coil 220, or may be connected to the above-described constituent elements. The same constituent elements as those of FIG. 6 will be described with reference to FIG. 6.

The rotation frame 524 may include a connection frame 5241 that rotates while being connected to the rotary shaft 5121 of the motor 511, and a side frame 5242 vertically provided at the end of the connection frame 5241 and having the light source module 522. In addition, the rotation frame 524 may further include a shaft frame 5243 that is provided on the rotary shaft and has the light receiving unit 521 at the end thereof.

The connection frame 5241 may be a frame vertically connected to the rotary shaft 5121 and may include the second PCB 523. At least one side frame 5242 may be provided along a circumferential direction at the end of the radial direction from the connection frame 5241. The side frame 5242 may be provided perpendicular to the connection frame 5241 toward the second fixed portion 530. The shaft frame 5243 may extend toward the second fixed portion 530 while passing through the central axis of the cylindrical space formed by rotation of the side frame 5242.

Figure 12:
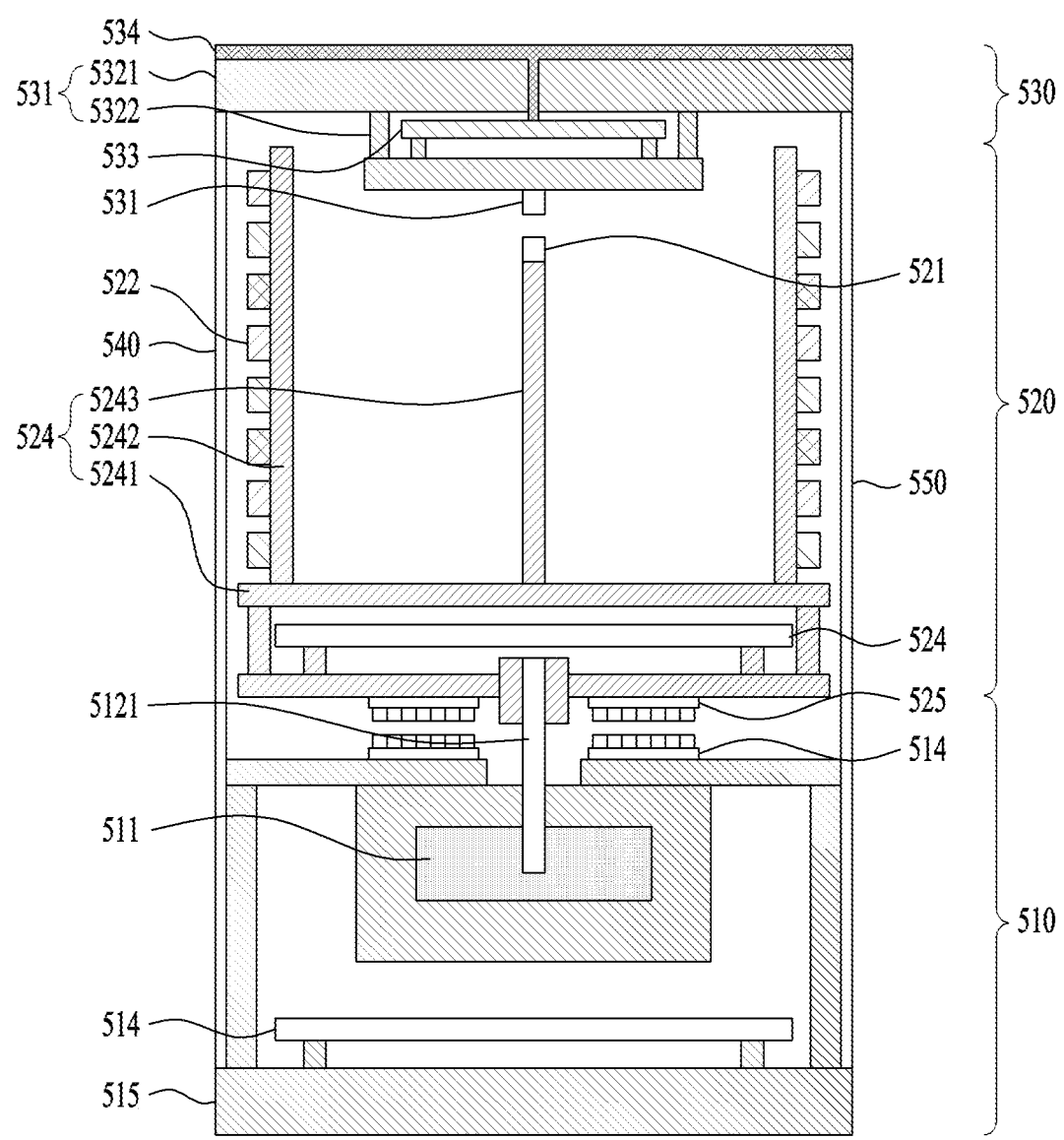
FIG. 12 illustrates a second embodiment of the rotary display device shown in FIG. 9.

FIG. 12 illustrates the second embodiment of the rotary display device shown in FIG. 9. For a description of the same configuration as those of FIG. 9, refer to FIG. 9.

The fixed portions 510 and 530 may be classified into a first fixed portion 510 provided at one side of the rotary portion 520 based on the rotary shaft 5121 and a second fixed portion 530 provided at the other side of the rotary portion 520 based on the rotary shaft 5121. In addition, the first fixed portion 510 and the second fixed portion 530 may be fixed by a transparent frame 540 provided around the rotary portion 520.

The first fixed portion 510 may include the motor 511 for rotationally driving the rotary portion 520 and a first PCB 514. In addition, the first fixed portion 510 may form a body by the first fixed frame 515 in which the motor 511 and the first PCB 514 are mounted, and may include the transmission coil 516 for wirelessly supplying power to the rotary portion 520.

Here, the first PCB 514 may further include at least one of the wireless power transmitter 121, the DC-DC converter 122, the voltage generator (LDO) 123, the controller 124, the infrared (IR) emitter 125, and the RF module 126 shown in FIG. 6. For a description of the same constituent elements as those of FIG. 6, refer to FIG. 6.

The second fixed portion 530 may include the light emitting unit 531. Additionally, the second fixed portion 530 may include the second fixed frame 532 that includes the light emitting unit 531 mounted therein and covers the other side of the rotary portion 520. Here, at least one of the third PCB 533 and the antenna 534 may be mounted on the second fixed frame 532.

The light emitting unit 531 may be provided to face the light receiving unit 521 included in the rotary portion 520. Specifically, the light emitting diode (LED) of the light emitting unit 531 may be provided to face the light receiving element of the light receiving unit 521. In this case, the light emitting diode (LED) and the light receiving element may be spaced apart from each other by a predetermined distance.

The second fixed frame 5321 may include a cover frame 5321 covering the other side of the rotary portion 520, and a lower frame 5322 provided below the cover frame 5322 to form an accommodation space. The accommodation space may be a space in which the third PCB 533 is mounted. The lower frame 5322 may be inserted into the cylindrical space in which the rotary portion 520 outputs an image so that at least a portion of the accommodation space is included in the accommodation space.

The third PCB 533 may include the input unit 512 and the conversion unit 513 described in FIG. 9. In some cases, the third PCB 533 may be implemented as a plurality of substrates as needed. The input unit 512 and the conversion unit 513 may be provided on the third PCB 533 as one chip or different chips.

Here, the input unit 512 may wirelessly receive image data through the antenna 534 provided in the second fixed portion 530. The second fixed portion 530 may directly receive image data from the outside without receiving the image data from the first fixed portion 510. In this case, the connection wire 500 (see FIG. 11) for transmitting image data from the first fixed portion 510 to the second fixed portion 530 may be omitted.

The transparent frame 540 may have a cylindrical shape surrounding the rotary portion 520 and connect the first fixed portion 510 and the second fixed portion 530 to each other. In addition, the transparent frame 540 may include the connection wire 550 for electrically connecting the first PCB 514 provided in the first fixed portion 510 to the light emitting unit 531 provided in the second fixed portion 530. The connection wire 550 for use in the second embodiment may use a transparent conductive wire as a wire for supplying power.

The rotary portion 520 may include the light receiving unit 521 that is provided on the rotary shaft 5121 of the motor 511 to receive the optical signal emitted by the light emitting unit 531, and the light source module 522 that outputs the received image data as an optical signal. In addition, the rotary portion 520 may further include at least one of the second PCB 523 for controlling the light source module 522, the rotation frame 524 constituting the body of the rotary portion 520, and the reception coil 525 for wirelessly receiving power.

The light receiving unit 521 may include the light receiving element 5211 for converting an optical signal into an electrical signal, and the amplifier 5212 for amplifying the electrical signal received by the light receiving element 5211.

The light source module 522 may be configured to include a plurality of light emitting diodes (LEDs), and may be a component corresponding to the panel 310 shown in FIG. 2.

The second PCB 523 may include the restoration unit 523 and the image processor 524 described in FIG. 9. In some cases, the second PCB 523 may be implemented as a plurality of substrates capable of being separated from each other. The restoration unit 512 and the image processor 524 may be implemented as different chips and provided in the second PCB 523.

Additionally, the second PCB 523 may further include at least one of the wireless power transmitter 211, the DC-DC converter 212, the voltage generator (LDO), the controller 214, the infrared (IR) receiver 215, and the reception coil 220, or may be connected to the above-described constituent elements. The same constituent elements as those of FIG. 6 will be described with reference to FIG. 6.

The rotation frame 524 may include a connection frame 5241 that rotates while being connected to the rotary shaft 5121 of the motor 511, and a side frame 5242 vertically provided at the end of the connection frame 5241 and having the light source module 522. In addition, the rotation frame 524 may further include a shaft frame 5243 that is provided on the rotary shaft and has the light receiving unit 521 at the end thereof.

The connection frame 5241 may be a frame vertically connected to the rotary shaft 5121 and may include the second PCB 523. At least one side frame 5242 may be provided along a circumferential direction at the end of the radial direction from the connection frame 5241. The side frame 5242 may be provided perpendicular to the connection frame 5241 toward the second fixed portion 530. The shaft frame 5243 may extend toward the second fixed portion 530 while passing through the central axis of the cylindrical space formed by rotation of the side frame 5242.

Figure 13:
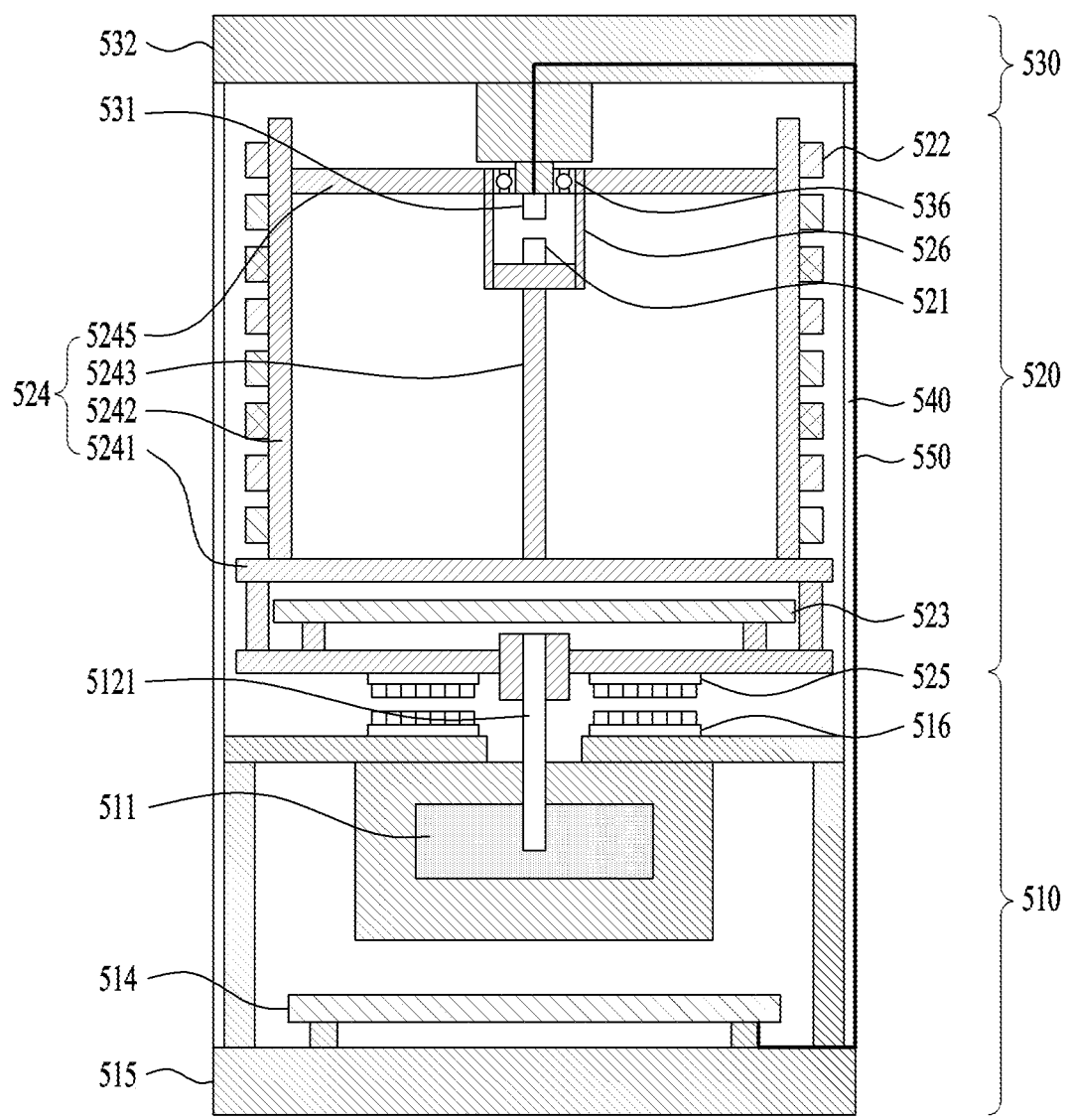
FIG. 13 illustrates a third embodiment of the rotary display device shown in FIG. 9.

FIG. 13 illustrates a third embodiment of the rotary display device of FIG. 9. Specifically, FIG. 13 includes additional configurations based on the first embodiment. In some cases, additional components may be included in the second embodiment.

The fixed portions 510 and 530 may be classified into a first fixed portion 510 provided at one side of the rotary portion 520 based on the rotary shaft 5121 and a second fixed portion 530 provided at the other side of the rotary portion 520 based on the rotary shaft 5121. In addition, the first fixed portion 510 and the second fixed portion 530 may be fixed by a transparent frame 540 provided around the rotary portion 520.

The first fixed portion 510 may include the motor 511 for rotationally driving the rotary portion 520 and a first PCB 514. In addition, the first fixed portion 510 may form a body by the first fixed frame 515 in which the motor 511 and the first PCB 514 are mounted, and may include the transmission coil 516 for wirelessly supplying power to the rotary portion 520.

The first PCB 514 may include the input unit 512 and the conversion unit 513 described in FIG. 9. In some cases, the first PCB 533 may be implemented as a plurality of substrates as needed. The input unit 512 and the conversion unit 513 may be provided on the first PCB 514 as one chip or different chips.

Here, the first PCB 514 may further include at least one of the wireless power transmitter 121, the DC-DC converter 122, the voltage generator (LDO) 123, the controller 124, the infrared (IR) receiver 125, and the RF module 126, or may be connected to the above-described constituent elements. The same constituent elements as those of FIG. 6 will be described with reference to FIG. 6.

The second fixed portion 530 may include the light emitting unit 531. Additionally, the second fixed portion 530 may include the second fixed frame 532 that includes the light emitting unit 531 mounted therein and covers the other side of the rotary portion 520.

The light emitting unit 531 may be provided to face the light receiving unit 521 included in the rotary portion 520. Specifically, the light emitting diode (LED) of the light emitting unit 531 may be provided to face the light receiving element of the light receiving unit 521. In this case, the light emitting diode (LED) and the light receiving element may be spaced apart from each other by a predetermined distance.

The transparent frame 540 may be formed in a cylindrical shape surrounding the rotary portion 520 and connect the first fixed portion 510 and the second fixed portion 530 to each other. At this time, the transparent frame 540 may include a connection wire 550 for electrically connecting the first PCB 514 provided in the first fixed portion 510 to the light emitting unit 531 provided in the second fixed portion 530.

Image data may be converted into a serial signal in the first fixed portion 510, and the serial signal may be transmitted to the light emitting unit 531 through the connection wire 550. When image data formed into a parallel signal is transmitted to the second fixed portion 510, as many connection wires 550 as the number of channels should be used. Since the connection wires 550 may interfere with a field of view (FOV) of an observer who observes the image being output to the rotary portion 520 in all directions, it is more advantageous in that only one connection wire rather than multiple connection wires is used.

In some cases, the connection wire 550 may be a metal wire made of a transparent material. However, a metal wire made of a transparent material may not be suitable for transmitting image data in that a loss due to internal resistance is large. Accordingly, the metal wire made of a transparent material may be used to supply power from the first fixed portion 510 to the second fixed portion 530. That is, the connection wire 550 may include a first conducting wire for transmitting image data and a second conducting wire for supplying power. In this case, a general conducting wire having a low internal resistance may be used as the first conducting wire, and a metal conductor made of a transparent material may be used as the second conducting wire.

The rotary portion 520 may include a light receiving unit 521 that is provided on the rotary shaft 5121 of the motor 511 to receive the optical signal emitted by the light emitting unit 531, and a light source module 522 that outputs the received image data as an optical signal. The rotary portion 520 may further include at least one of the second PCB 523 for controlling the light source module 522, the rotation frame 524 constituting the body of the rotary portion 520, and the reception coil 525 for wirelessly receiving power.

The light receiving unit 521 may include a light receiving element 5211 for converting an optical signal into an electrical signal, and an amplifier 5212 for amplifying the electrical signal received by the light receiving element 5211.

The light source module 522 may be configured to include a plurality of light emitting diodes (LEDs), and may be a component corresponding to the panel 310 shown in FIG. 2.

The second PCB 523 may include the restoration unit 523 and the image processor 524 described in FIG. 9. In some cases, the second PCB 523 may be implemented as a plurality of substrates as needed. The restoration unit 523 and the image processor 524 may be implemented as different chips and provided in the second PCB 523.

Additionally, the second PCB 523 may further include at least one of the wireless power transmitter 211, the DC-DC converter 212, the voltage generator (LDO), the controller 214, the infrared (IR) receiver 215, and the reception coil 220, or may be connected to the above-described constituent elements. The same constituent elements as those of FIG. 6 will be described with reference to FIG. 6.

The rotation frame 524 may include a connection frame 5241 that rotates while being connected to the rotary shaft 5121 of the motor 511, and a side frame 5242 vertically provided at the end of the connection frame 5241 and having the light source module 522. In addition, the rotation frame 524 may further include a shaft frame 5243 that is provided on the rotary shaft and has the light receiving unit 521 at the end thereof.

The connection frame 5241 may be a frame vertically connected to the rotary shaft 5121 and may include the second PCB 523. At least one side frame 5242 may be provided along a circumferential direction at the end of the radial direction from the connection frame 5241. The side frame 5242 may be provided perpendicular to the connection frame 5241 toward the second fixed portion 530. The shaft frame 5243 may extend toward the second fixed portion 530 while passing through the central axis of the cylindrical space formed by rotation of the side frame 5242.

The rotary display device according to the third embodiment may further include a cover member 526. The cover member 526 may be fixed to the second fixed portion 530 and the rotary portion 520, may be provided to surround the light emitting unit 531 and the light receiving unit 521, thereby blocking ambient light from being applied to the light receiving unit 521. Specifically, the cover member 526 may be a cylindrical member that is provided to surround the light emitting diode (LED) of the light emitting unit 531 and the light receiving element of the light receiving unit 521.

One end of the cover member 526 may be fixed to one of the second fixed portion 530 and the rotary portion 520, and the other end of the cover member 526 may be connected to the other one through a bearing 536. FIG. 13 shows an embodiment in which one end of the cover member 526 is fixed to the rotary portion 520 and the other end of the cover member 526 is provided with the bearing 536 such that the cover member 526 is rotatably connected to the second fixed portion 530.

The cover member 526 may block noise caused by ambient light, and may enable the opposite side thereof to be fixed to one side thereof connected to the rotary shaft 5121, thereby preventing the rotary portion 520 from shaking.

The rotation frame 524 of the rotary portion 520 may include the cover member 526 provided at the end of the shaft frame 5243. Specifically, the shaft frame 5243 may include the light receiving unit 521 provided at the end thereof, and the cover member 526 provided to surround the light receiving unit 521 so that the cover member 526 can be rotationally driven by the bearing 536 in the second fixed portion 530.

The rotation frame 524 may further include an extension frame 5245 extending in the direction of the rotary shaft from the side frame 5242 such that the extension frame 5245 is connected to the shaft frame 5243 or the cover member 526. The extension frame 5245 may prevent the end of the side frame 5242 from shaking when the side frame 5242 is rotationally driven.

At least one of the cover member 521, the bearing 536, and the extension frame 5245 additionally described in FIG. 13 can also be applied to the second embodiment of FIG. 12 within a mergeable range.

Figure 14:
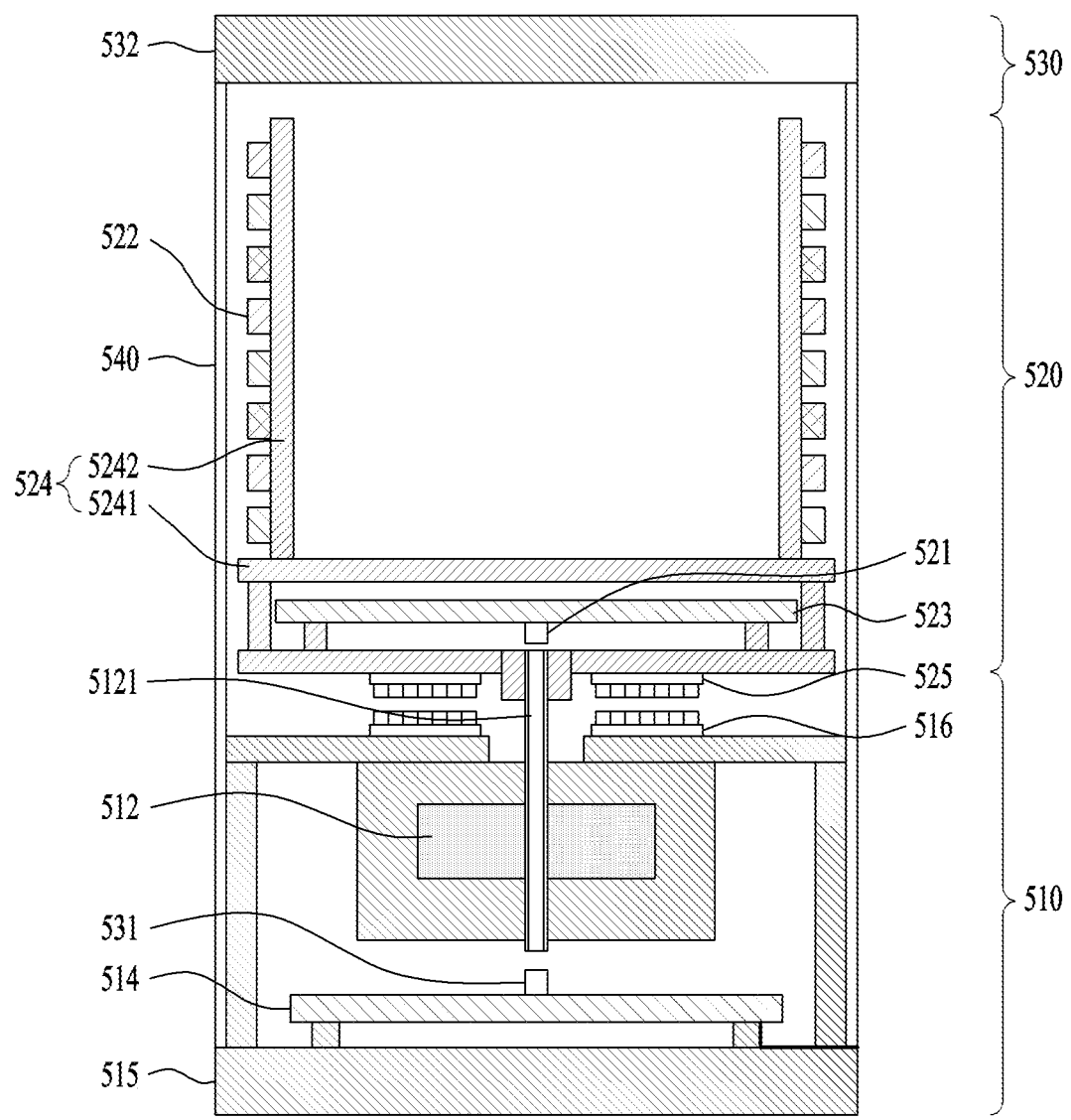
FIG. 14 illustrates a fourth embodiment of the rotary display device shown in FIG. 9.

FIG. 14 illustrates a fourth embodiment of the rotary display device shown in FIG. 9.

The fixed portions 510 and 530 may be classified into a first fixed portion 510 provided at one side of the rotary portion 520 based on the rotary shaft 5121 and a second fixed portion 530 provided at the other side of the rotary portion 520 based on the rotary shaft 5121. In addition, the first fixed portion 510 and the second fixed portion 530 may be fixed by a transparent frame 540 provided around the rotary portion 520.

The first fixed portion 510 may include the motor 511 for rotationally driving the rotary portion 520, a first PCB 514, and a light emitting unit 531. In addition, the first fixed portion 510 may form a body by the first fixed frame 515 in which the motor 511, the first PCB 514, and the light emitting unit 531 are mounted, and may include the transmission coil 516 for wirelessly supplying power to the rotary portion 520.

The first PCB 514 may include the input unit 512 and the conversion unit 513 described in FIG. 9. In some cases, the first PCB 514 may be implemented as a plurality of substrates capable of being separated from each other. The input unit 512 and the conversion unit 513 may be provided on the first PCB 514 as one chip or different chips.

Here, the first PCB 514 may further include at least one of the wireless power transmitter 121, the DC-DC converter 122, the voltage generator (LDO) 123, the controller 124, the infrared (IR) receiver 125, and the RF module 126, or may be connected to the above-described constituent elements. The same constituent elements as those of FIG. 6 will be described with reference to FIG. 6.

The second fixed portion 530 may include a second fixed frame 532 covering the other side of the rotary portion 520.

The transparent frame 540 may have a cylindrical shape surrounding the rotary portion 520 and connect the first fixed portion 510 and the second fixed module 530 to each other.

The rotary portion 520 may include a light receiving unit 521 that is provided on the rotary shaft 5121 of the motor 511 to receive the optical signal emitted by the light emitting unit 531, and a light source module 522 that outputs the received image data as an optical signal. In addition, the rotary portion 520 may further include at least one of the second PCB 523 for controlling the light source module 522, the rotation frame 524 constituting the body of the rotary portion 520, and the reception coil 525 for wirelessly receiving power.

The light receiving unit 521 may include a light receiving element 5211 (see FIG. 9) for converting an optical signal into an electrical signal, and an amplifier 5212 (see FIG. 9) for amplifying the electrical signal received by the light receiving element 5211.

The light source module 522 may be configured to include a plurality of light emitting diodes (LEDs), and may be a component corresponding to the panel 310 shown in FIG. 2.

The second PCB 523 may include the restoration unit 523 and the image processor 524 described in FIG. 9. In some cases, the second PCB 523 may be implemented as a plurality of substrates as needed. The restoration unit 523 and the image processor 524 may be implemented as different chips and provided in the second PCB 523.

Additionally, the second PCB 523 may further include at least one of the wireless power transmitter 211, the DC-DC converter 212, the voltage generator (LDO), the controller 214, the infrared (IR) receiver 215, and the reception coil 220, or may be connected to the above-described constituent elements. The same constituent elements as those of FIG. 6 will be described with reference to FIG. 6.

The rotation frame 524 may include a connection frame 5241 that rotates while being connected to the rotary shaft 5121 of the motor 511, and a side frame 5242 vertically provided at the end of the connection frame 5241 and having the light source module 522.

The connection frame 5241 may be a frame vertically connected to the rotary shaft 5121 and may include the second PCB 523. At least one side frame 5242 may be provided along a circumferential direction at the end of the radial direction from the connection frame 5241. The side frame 5242 may be provided perpendicular to the connection frame 5241 toward the second fixed module 530.

The light receiving unit 521 may receive an optical signal provided through the light emitting unit 531 through the rotary shaft of the motor 511. Specifically, the motor 511 may rotationally drive the rotary portion 520 through a hollow rotary shaft. That is, the fixed module 510 may communicate with the rotary portion 520 through the hollow rotary shaft 5121 connected to the motor 511.

The light emitting unit 531 may emit an optical signal to the light receiving unit 521 using a hollow portion of the hollow rotary shaft 5121. In some cases, the hollow rotary shaft 5121 may further include a light guide member that leads the optical signal emitted from the light emitting unit 531 to the light receiving unit 521.

In the case of providing an optical signal using the hollow rotary shaft 5121, the light emitting unit 531 may be provided in the same axial direction as the motor 511. The rotary display device can be manufactured without separating the motor 511 and the light emitting unit 531 from each other in both directions from the rotary shaft 5121, so that the rotary display device can be simplified in structure.

The above description is merely illustrative of the technical spirit of the present disclosure. It will be apparent to those skilled in the art that various modifications and variations can be made in the present disclosure without departing from the spirit and scope of the disclosure.

Therefore, the embodiments disclosed in the present disclosure are merely illustrative of the technical spirit of the present disclosure. The scope of the technical spirit of the present disclosure is not limited by these embodiments.

The scope of the present disclosure should be defined by the appended claims, and all technical ideas within the scope equivalent thereto should be construed as being within the scope of the present disclosure.

The invention claimed is:

1. A rotary display device including a fixed portion and a rotary portion connected to the fixed portion to rotate, wherein:
   the fixed portion includes
      a motor for rotationally driving the rotary portion;
      an input unit for receiving image data; and
      a light emitting unit for emitting an optical signal corresponding to the image data,
   the light emitting unit includes:
      a light emitting diode (LED) configured to convert an electrical signal into the optical signal; and
      a driver configured to drive the light emitting diode (LED),
   the rotary portion includes
      a light receiving unit provided on a rotary shaft of the motor to receive the optical signal; and
      a light source module configured to output the image data received as the optical signal,
   the light receiving unit includes:
      a light receiving element configured to convert the optical signal into an electrical signal; and
      an amplifier configured to convert a signal received by the light receiving element, and
   the light emitting diode (LED) is provided on an extension line of the rotary shaft, and is spaced apart from the light receiving element by a predetermined distance to face the light receiving element.

2. The rotary display device according to claim 1, wherein the fixed portion includes:
   a first fixed portion having the motor and provided at a first side of the rotary portion with respect to the rotary shaft;
   a second fixed portion having the light emitting unit and provided at a second side of the rotary portion; and
   a transparent frame configured to interconnect the first fixed portion and the second fixed portion, and provided to surround the rotary portion.

3. The rotary display device according to claim 1, wherein:
   the fixed portion further includes a conversion unit configured to serially convert the image data in order to transmit the optical signal as the optical signal, and
   the rotary portion further includes a restoration unit configured to parallel-convert the optical signal in order to restore the optical signal to the image data.

4. The rotary display device according to claim 2, wherein:
   the first fixed portion includes the input unit and the conversion unit, and
   the transparent frame further includes a connection wire for transmitting the image data serially converted by the conversion unit to the light emitting unit.

5. The rotary display device according to claim 2, wherein:
   the second fixed portion includes the input unit and the conversion unit, and
   the input unit wirelessly receives the image data.

6. The rotary display device according to claim 1, further comprising:
   a cover member fixed to a second fixed portion or the rotary portion, and provided to surround the light emitting diode (LED) and the light receiving element, thereby blocking ambient light from being applied to the light receiving element.

7. The rotary display device according to claim 6, wherein:
the cover member is configured such that a first end thereof is fixed to one of the second fixed portion and the rotary portion and a second end thereof has a bearing and is connected to the other one of the second fixed portion and the rotary portion.

8. The rotary display device according to claim 7, wherein the rotary portion includes:
a connection frame configured to rotate while being connected to the motor;
a side frame vertically provided at an end portion of the connection frame and including the light source module;
a shaft frame provided on the connection frame along the rotary shaft and including the light receiving element and the cover member at an end portion thereof; and
an extension frame configured to extend from the side frame in a direction of the rotary shaft, and connected to the shaft frame or the cover member.

9. The rotary display device according to claim 1, wherein:
the fixed portion communicates with the rotary portion through a hollow rotary shaft connected to the motor; and
the light emitting unit emits the optical signal to the light receiving unit using a hollow portion of the hollow rotary shaft.

10. A rotary display device including a fixed portion and a rotary portion connected to the fixed portion to rotate, wherein:
the fixed portion includes
a motor for rotationally driving the rotary portion;
an input unit for receiving image data; and
a light emitting unit provided on a rotary shaft of the motor and emitting an optical signal corresponding to the image data,
the light emitting unit includes:
a light emitting diode (LED) configured to convert an electrical signal into the optical signal; and
a driver configured to drive the light emitting diode (LED), the rotary portion includes
a light receiving unit provided on the rotary shaft of the motor and facing the light emitting unit to receive the optical signal; and
a light source module configured to output the image data received as the optical signal,
the light receiving unit includes:
a light receiving element configured to convert the optical signal into an electrical signal; and
an amplifier configured to convert a signal received by the light receiving element, and
the light emitting diode (LED) is provided on an extension line of the rotary shaft, and is spaced apart from the light receiving element by a predetermined distance to face the light receiving element.

11. The rotary display device of claim 10, wherein the fixed portion includes:
a first fixed portion having the motor and provided at a first side of the rotary portion with respect to the rotary shaft; and
a second fixed portion having the light emitting unit and provided at a second side of the rotary portion.

12. The rotary display device of claim 11, wherein the fixed portion further includes a frame configured to interconnect the first fixed portion and the second fixed portion.

13. The rotary display device of claim 12, wherein the frame includes a transparent frame having a cylindrical shape and provided outside of rotary portion.

14. The rotary display device of claim 10, wherein:
the fixed portion further includes a conversion unit configured to serially convert the image data in order to transmit the optical signal as the optical signal, and
the rotary portion further includes a restoration unit configured to parallel-convert the optical signal in order to restore the optical signal to the image data.

15. The rotary display device of claim 11, further comprising:
a cover member fixed to the second fixed portion or the rotary portion, and provided outside of the light emitting diode (LED) and the light receiving element, thereby blocking ambient light from being applied to the light receiving element.

16. The rotary display device of claim 15, wherein a first end of the cover member is fixed to one of the second fixed portion and the rotary portion and a second end of the cover member has a bearing and is connected to the other one of the second fixed portion and the rotary portion.

17. The rotary display device of claim 16, wherein the rotary portion includes:
a connection frame configured to rotate while being connected to the motor;
a side frame vertically provided at an end portion of the connection frame and including the light source module; and
a shaft frame provided on the connection frame along the rotary shaft and including the light receiving element and the cover member at an end portion thereof.

18. The rotary display device of claim 17, wherein the rotary portion further includes an extension frame configured to extend from the side frame in a direction of the rotary shaft, and connected to the shaft frame or the cover member.

19. The rotary display device of claim 10, wherein:
the fixed portion communicates with the rotary portion through a hollow rotary shaft connected to the motor; and
the light emitting unit emits the optical signal to the light receiving unit using a hollow portion of the hollow rotary shaft.

* * * * *